United States Patent [19]

Glen et al.

[11] Patent Number: 5,738,479
[45] Date of Patent: Apr. 14, 1998

[54] SYSTEM AND APPARATUS FOR CONVERTING A RAILCAR OR TRUCK TRAILER TO MULTIPLE USES

[76] Inventors: Donald Douglas Gordon Glen; Bradley Donald David Glen, both of Box 39, Lunbreck, Alberta, Canada, T0K 1H0

[21] Appl. No.: 393,808

[22] Filed: Feb. 24, 1995

[51] Int. Cl.⁶ .................. B60P 7/08; B65G 67/02
[52] U.S. Cl. .............. 414/373; 414/21; 410/76; 410/77; 410/80; 410/90; 177/136
[58] Field of Search .................. 410/69, 70, 71, 410/73, 76, 77, 80, 81, 90, 54; 280/DIG. 8; 296/35.3; 414/21, 373, 391, 392, 399; 177/136, 137, 254

[56] References Cited

U.S. PATENT DOCUMENTS

| | | | |
|---|---|---|---|
| 2,478,578 | 8/1949 | Gottshall | 410/81 |
| 2,656,196 | 10/1953 | Fellabaum | 280/81 |
| 2,768,021 | 10/1956 | Kaster | 296/10 |
| 3,168,877 | 2/1965 | Clejan | 410/80 X |
| 3,255,906 | 6/1966 | Proler et al. | 214/390 |
| 3,294,420 | 12/1966 | Martin | 280/415 |
| 3,439,821 | 4/1969 | Hand | 410/80 X |
| 3,490,626 | 1/1970 | Kirk | 410/80 |
| 3,521,773 | 7/1970 | Geister | 214/390 |
| 3,561,621 | 2/1971 | Rivers, Jr. | 214/38 |
| 3,618,795 | 11/1971 | Burch | 410/90 X |
| 3,695,471 | 10/1972 | Rivers, Jr. | 214/515 |
| 3,826,398 | 7/1974 | Rivers, Jr. | 220/1.5 |
| 4,089,539 | 5/1978 | Berger | 410/80 |
| 4,496,187 | 1/1985 | Pontecorvo | 296/182 |
| 4,537,548 | 8/1985 | Lockhart | 414/24.5 |
| 4,647,101 | 3/1987 | Ruggeri | 296/10 |
| 5,078,560 | 1/1992 | Patrick et al. | 410/68 |
| 5,230,434 | 7/1993 | Patrick et al. | 220/1.5 |
| 5,238,357 | 8/1993 | Patrick et al. | 414/420 |
| 5,478,974 | 12/1995 | O'Dea | 177/137 X |

FOREIGN PATENT DOCUMENTS

1147037  11/1957  France .................. 410/80

Primary Examiner—Karen B. Merritt
Assistant Examiner—Stephen Gordon
Attorney, Agent, or Firm—Oyen Wiggs Green & Mutala

[57] ABSTRACT

A system of modular attachments for a railcar or truck trailer to convert the trailer to various uses is disclosed. A system of compressed air driven locking pins allows the various modules to be readily secured to or removed from the trailer chassis. Air suspension shock absorbers permit the load to be weighed on the car or trailer.

14 Claims, 10 Drawing Sheets

SYSTEM AND APPARATUS FOR CONVERTING A RAILCAR OR TRUCK TRAILER TO MULTIPLE USES

TECHNICAL FIELD

The invention relates to the field of truck trailers, and more particularly to attachments for adapting such trailers to multiple uses.

BACKGROUND ART

Currently there are various types of trailers for tractor-trailer trucks. Some trailers are flatbed trailers which are suitable for carrying certain types of loads. Other trailers may be especially suited for carrying containers. Other trailers are tank trailers for carrying fuel, or milk or other liquids. In the case of existing trailers, it is necessary for the truck owner to purchase different trailers for each of these different uses. It would be more economic therefore for a truck owner to be able to use a single trailer chassis for multiple uses.

Certain prior art patents disclose systems for converting a single trailer to different uses. For example, U.S. Pat. No. 2,768,021 to Kaster discloses a trailer bed which is convertible from a flatbed to a hopper. The flatbed and hopper are removed or secured by threading or unthreading bolts. U.S. Pat. No. 3,255,906 to Proler et al. discloses removable units to convert a trailer to a "gondola", "bobtail truck" and a tank trailer. Hydraulic cylinders are used to lift the units off the trailer. U.S. Pat. No. 3,521,773 to Geister, discloses interchangeable containers for mounting on a truck trailer. The containers are provided with sockets which receive a plunger at the upper end of hydraulic cylinders. None of the prior art systems have been sufficiently useful, however, to be commercially successful.

DISCLOSURE OF INVENTION

The present invention provides a system of modular adapters for converting a trailer chassis to multiple uses, including bulk material hauling bin, flatbed deck, log hauling, tank trailer and containers. A system of compressed air driven locking pins allows the various modules to be readily secured to or removed from the trailer chassis.

BRIEF DESCRIPTION OF DRAWINGS

In drawings which illustrate a preferred embodiment of the invention.

BEST MODE(S) FOR CARRYING OUT THE INVENTION

Figure 1:
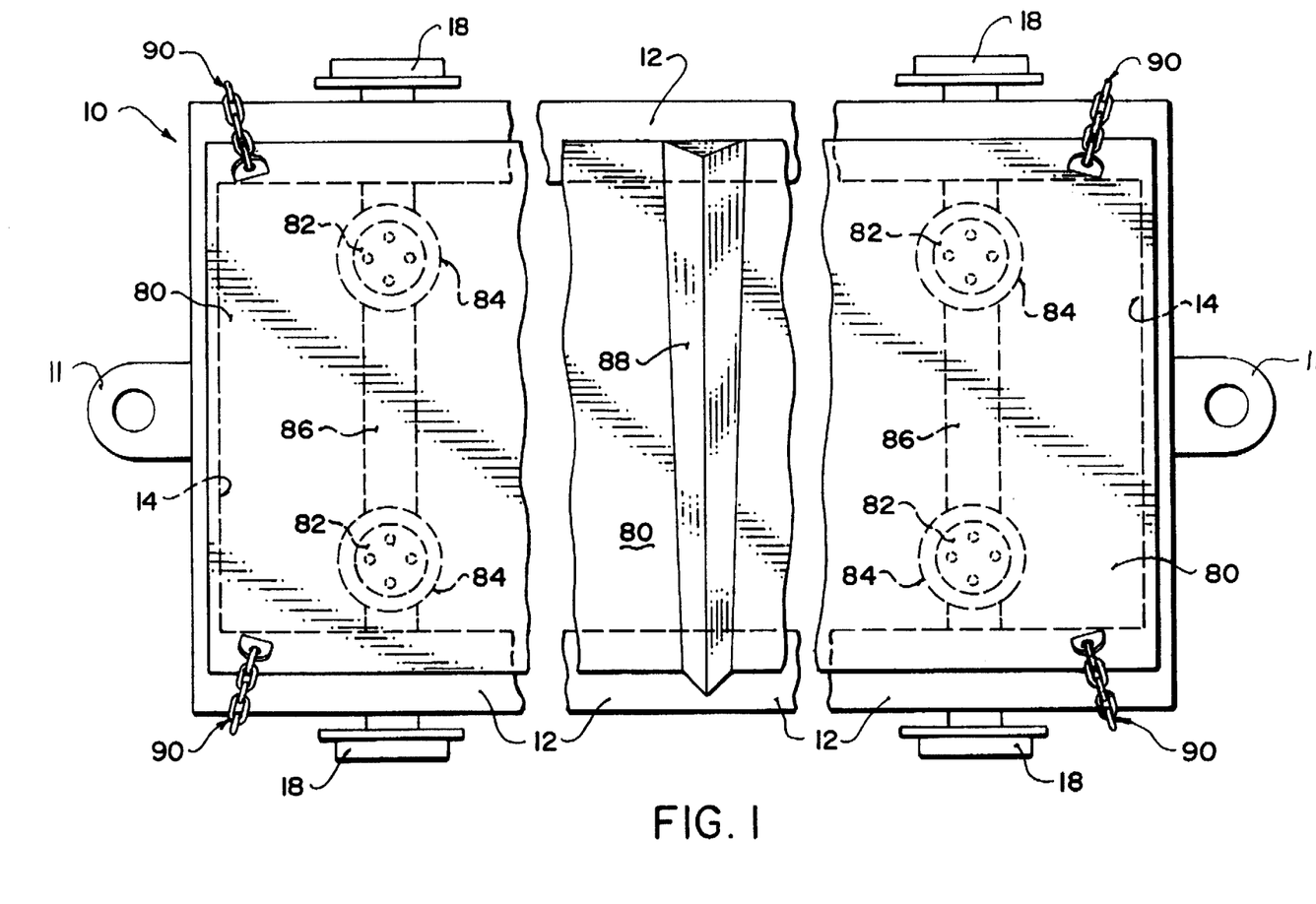
FIG. 1 is a top view of a railway car embodying the basic chassis of the invention, with broken lines indicating the car is longer than shown.
Figure 4:
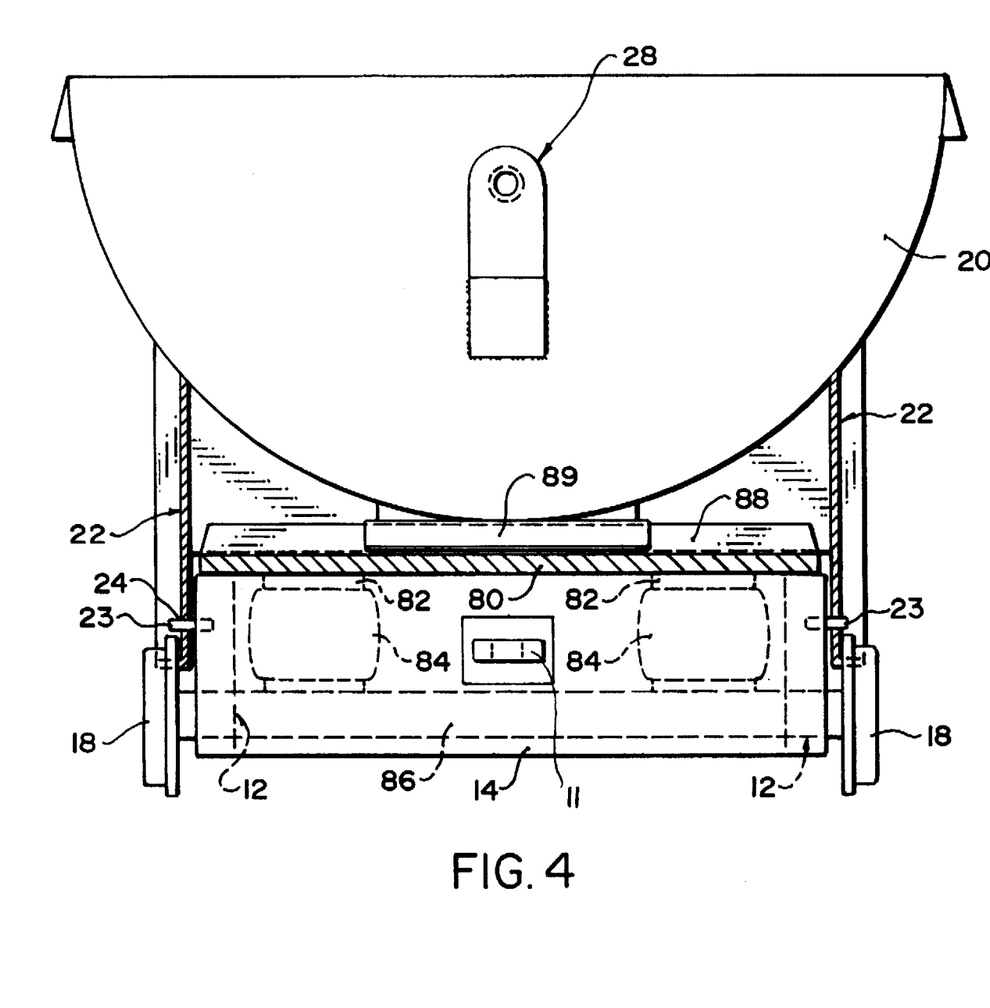
FIG. 4 is an end view of the invention as shown in FIG. 1 with a rock hauling module attached.

The basic frame for the invention is illustrated by reference numeral 10 in FIGS. 1 and 2, adapted for use on a wheeled rail car or truck trailer respectively. Frame 10 is a bare trailer frame, or rail trailer, constructed of two parallel T-1 steel rails 12 and crossbars 14. Railcar wheels 18, or truck wheels 18A, are mounted to frame 10 on axles 86. In FIG. 1 and 4, tongue 11 connects adjacent rail cars.

Figure 5:
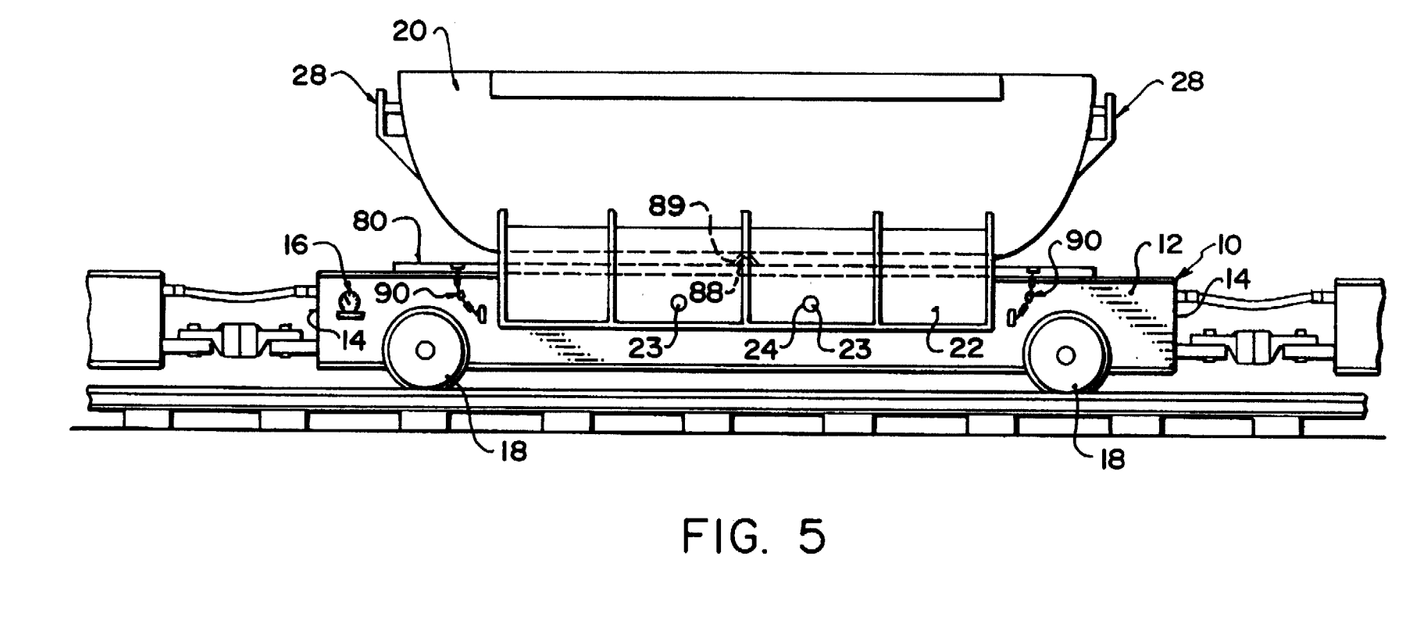
FIG. 5 is a side view of the invention as shown in FIG. 4.

As shown in FIG. 1 and 4, a plate 80 rides above frame 10 of the railcar on four circular metal disks 82, which in turn ride on four rubber air suspension shock absorbers 84, which rest on or above axles 86. The use of shock absorbers 84 allows a load to be weighed directly on the rail car or trailer. Shock absorbers 84 are pneumatically inflated by the compressed air system of the railcar or trailer. Angled cross-piece 88 causes the modules to be self-aligned on plate 80. Chains 90 (which are shown in different positions in FIG. 1 and 5 for ease of illustration) hold plate 80 on the chassis when the load is removed. Angle cross-piece 88 is a 4" square tubing mounted with the corners facing up and down. Corresponding 4" saddles 89 are attached crosswise to the underside of the various modules in order to align the modules to the frame 10 when placed on the cross-piece 88. Reflectors or other markings (not shown) on the trailer and modules are used to assist the operator in aligning the modules on the crossbar. Also the outside surface of frame 10 guides the inner surface of downwardly extending flange 22 of a modular member 20 (FIG. 4) onto the trailer or railcar frame 10.

Figure 2:
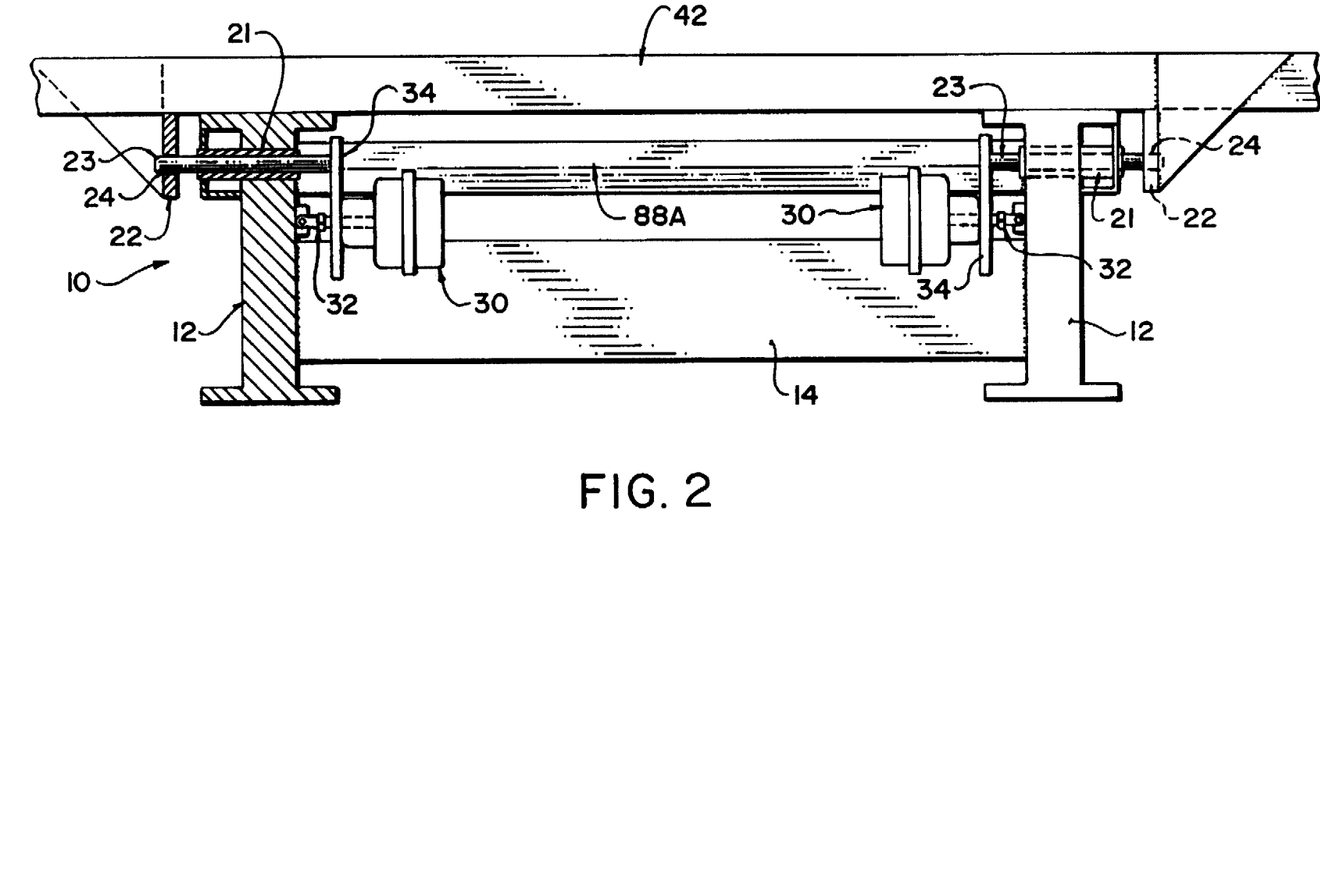
FIG. 2 is a cross-sectional view taken along lines 2—2 of FIG. 10.
Figure 3:
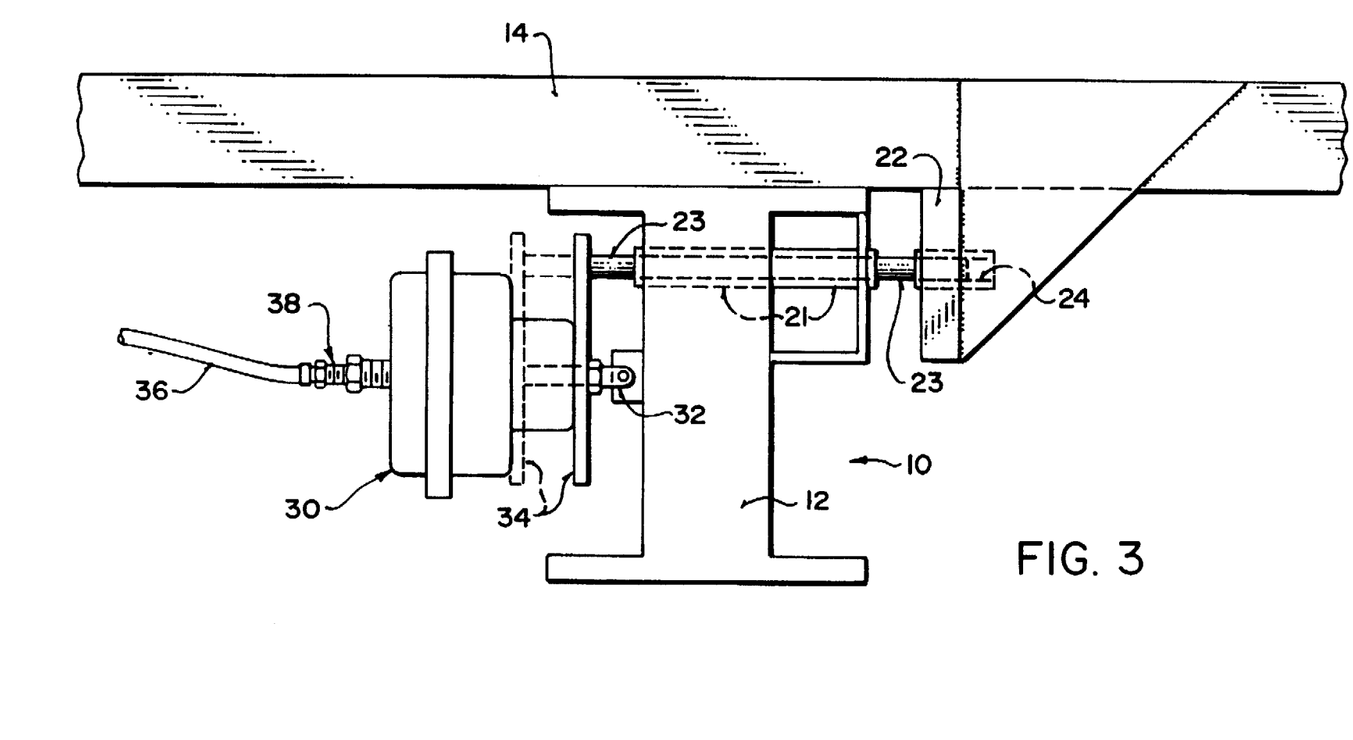
FIG. 3 is a detailed view of the locking pin assembly shown in FIG. 2.

The various modules are locked onto the frame 10 by locking pins 23 shown in FIG. 2 and 3. Each frame has a number of locking pin assemblies, preferably four, mounted on the inside of the rails 12. Each locking pin assembly consists of a Series-30 brake pot 30 with a spring lock air brake chamber, which is bolt mounted to rail 12 by bolt 32. The locking pins 23 are preferably solid steel rods mounted on plate 34 which, as shown in FIG. 3, moves from a position against pot 30 to an extended position away from pot 30. When plate 34 is in the extended position shown in FIG. 3, pin 23 extends through sleeves 21 in rails 12 and into corresponding holes 24 in the modules 20. The movement of plate 34 in brake pot 30 is air controlled, connected to the compressed air supply of the trailer by hoses 36 and connectors 38, and is switch activated. Double springs (not shown) are used to extend the locking pin 23 to the locking position when air pressure is not applied to brake pot 30, and the pin 23 is retracted when air pressure is applied to the pot 30.

Pressure gauge scales 16 are provided on each frame 10 for measuring the weight of the load on the frame. These scales are preferably stainless steel liquid filled gauges which are plumbed to the air suspension shock absorbers 84. These gauge scales 16 provide accurate axle weights for maximum loading as required by authorities. In this way the weight of the load on frame 10 can be read out at any time. In the case of a truck trailer with an existing air-ride suspension system, the gauges may be plumbed directly to the air-ride suspension system to read the weight over each group of axles, and shock absorbers 84 are not required in that event. Where the shock absorbers 84 are not used, angle piece 88A for receiving saddle 89 may be fixed to frame 10, as in FIG. 2.

The following modules are illustrative of the different uses possible with the system.

1. Bulk Materials Hauling Bin

FIGS. 4, 5, 8 and 9 illustrate a bin 20 for hauling rock, gravel and dry bulk commodities such as contaminated waste, rip-rap and ore. In its preferred form, the bin 20 has a volume of 9 cubic meters and is constructed of T-1 steel. For example such a bin can be constructed by cutting surplus steel tanks in half. A pair of plates 22 are welded to the underside of the bin to provide holes 24 for the locking pins 23 and to straddle the outside of the trailer or railcar rails 12. Saddles 89 are welded across the underside to align the bins on cross-pieces 88. The ends of the bins 20 are provided with lug and pin assemblies 28 for lifting purposes.

2. Tank Trailer

Figure 6:
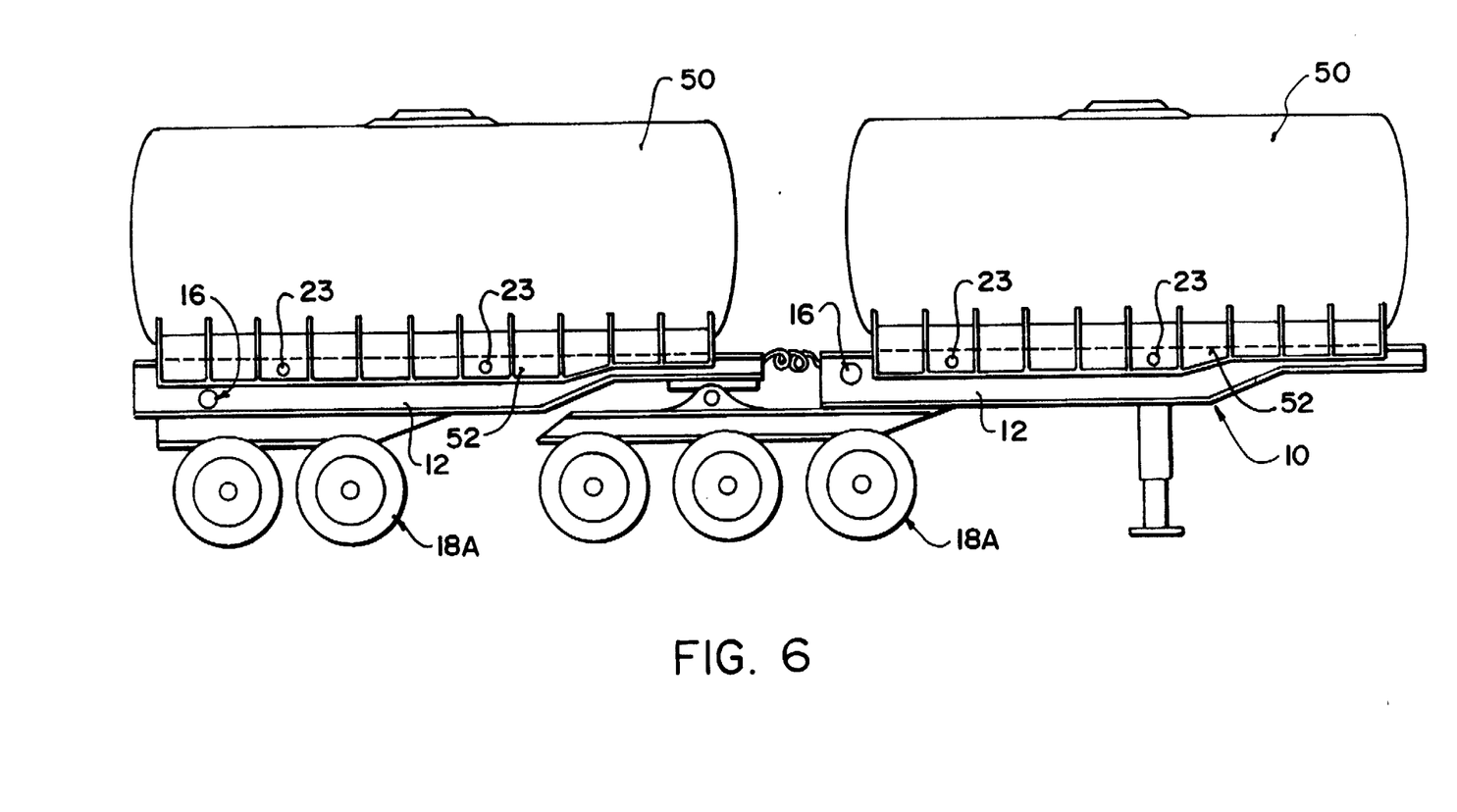
FIG. 6 is a side view of the invention as applied to a basic trailer chassis with a fuel tank module attached.

As shown in FIG. 6, the standard trailer chassis 10 is converted to a tank trailer by the addition of a tank module 50 which is secured by the locking pins 23 through flange plates 52, and aligned on the frame cross-piece 88 by saddle 89.

3. Container Trailer

Figure 7:
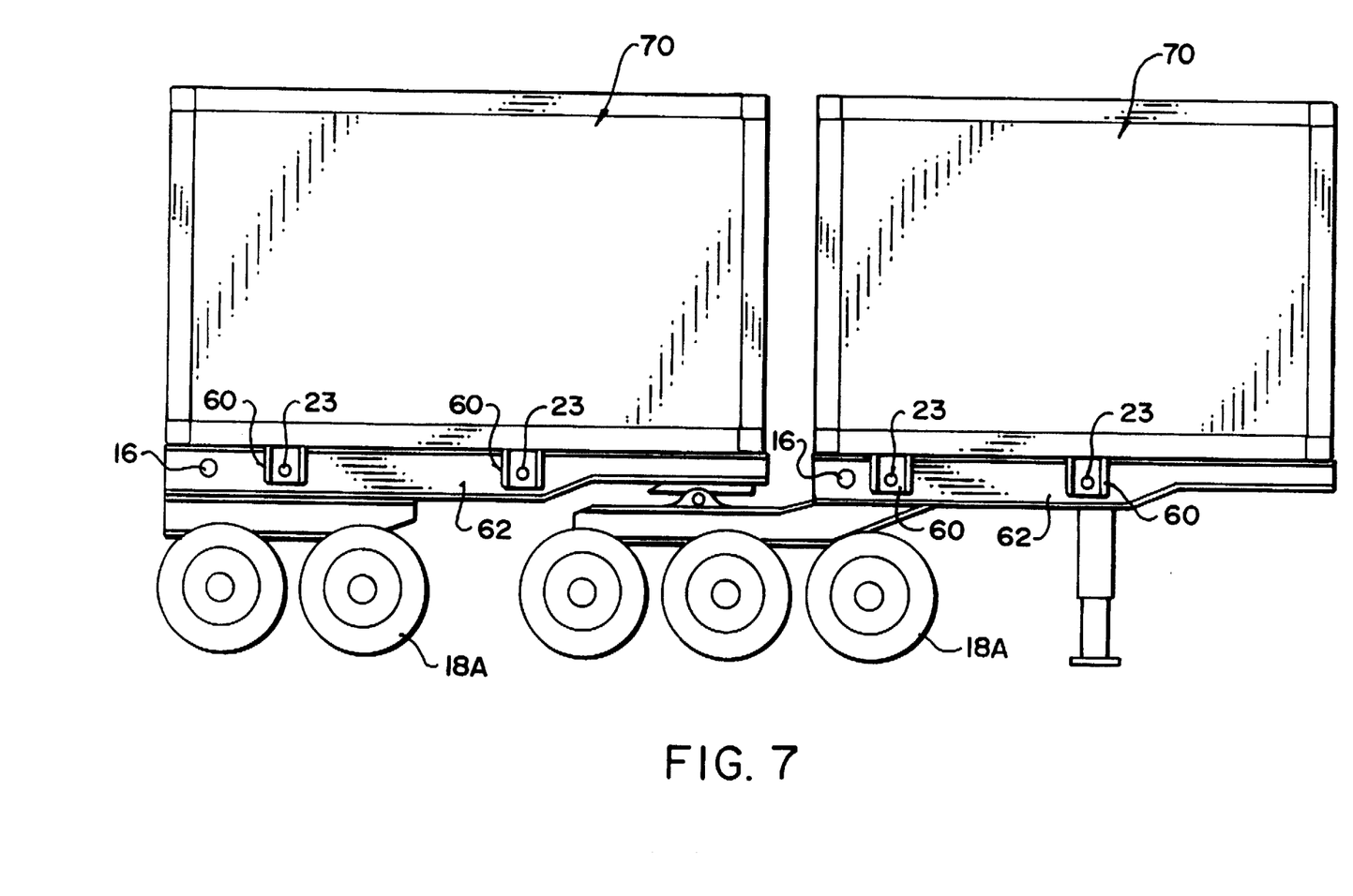
FIG. 7 is a side view of the invention as applied to a basic trailer chassis with a container module attached.

As shown in FIG. 7, the standard trailer chassis 10 is converted to carry container modules 70 by the addition of brackets 60 which are secured by the locking pins 23 through rails 62, and aligned on the frame cross-piece 88 by saddle 89.

4. Flatbed

Figure 10:
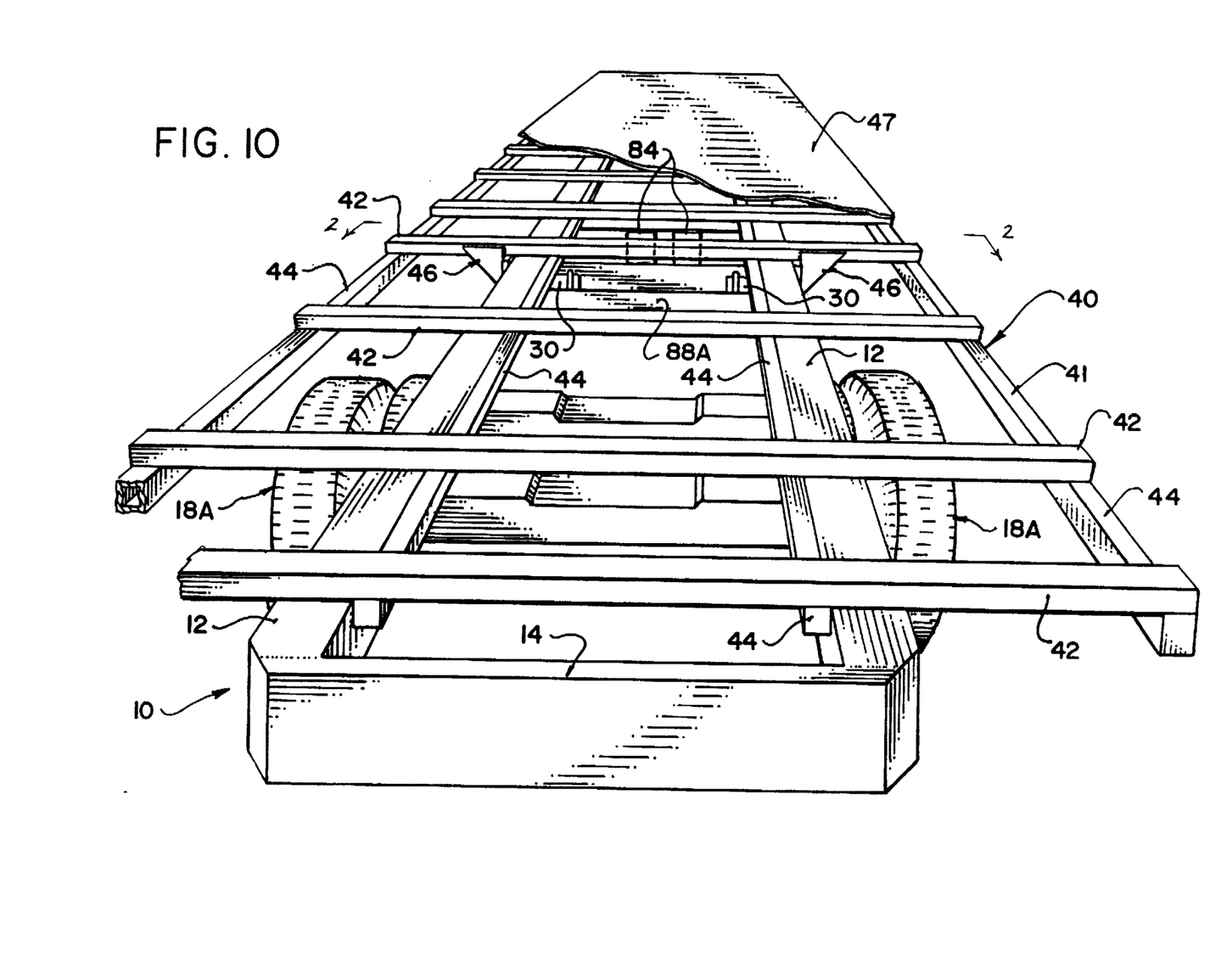
FIG. 10 is a perspective view, partially cut away, of the basic trailer chassis of the invention with a flat deck module attached.

FIG. 10 illustrates a flat deck attachment 40 to standard trailer chassis 10. Such a flat deck is useful for carrying lumber, veneer, plywood, chipboard, steel, pipe, hydro poles etc. The decks consist of a frame 41 formed of a series of parallel steel crossbars 42 between parallel bars 44. Every third crossbar 42 is provided with a pair of flanges 46 which have holes for receiving the locking pins 23 and which align the frame against the outside of the trailer rails 12. A wooden or metal deck 47, shown partially cut-away, can be mounted on frame 41 by bolts or the like for certain loads.

The basic trailer frame 10 can be converted for hauling logs by the addition of standard bunks (not shown) consisting of uprights with curved lower sections, which are bolted to a frame held in place and secured on frame 10 also by the locking pins 23. Loading and unloading can then be performed by a standard log loader.

Figure 8:
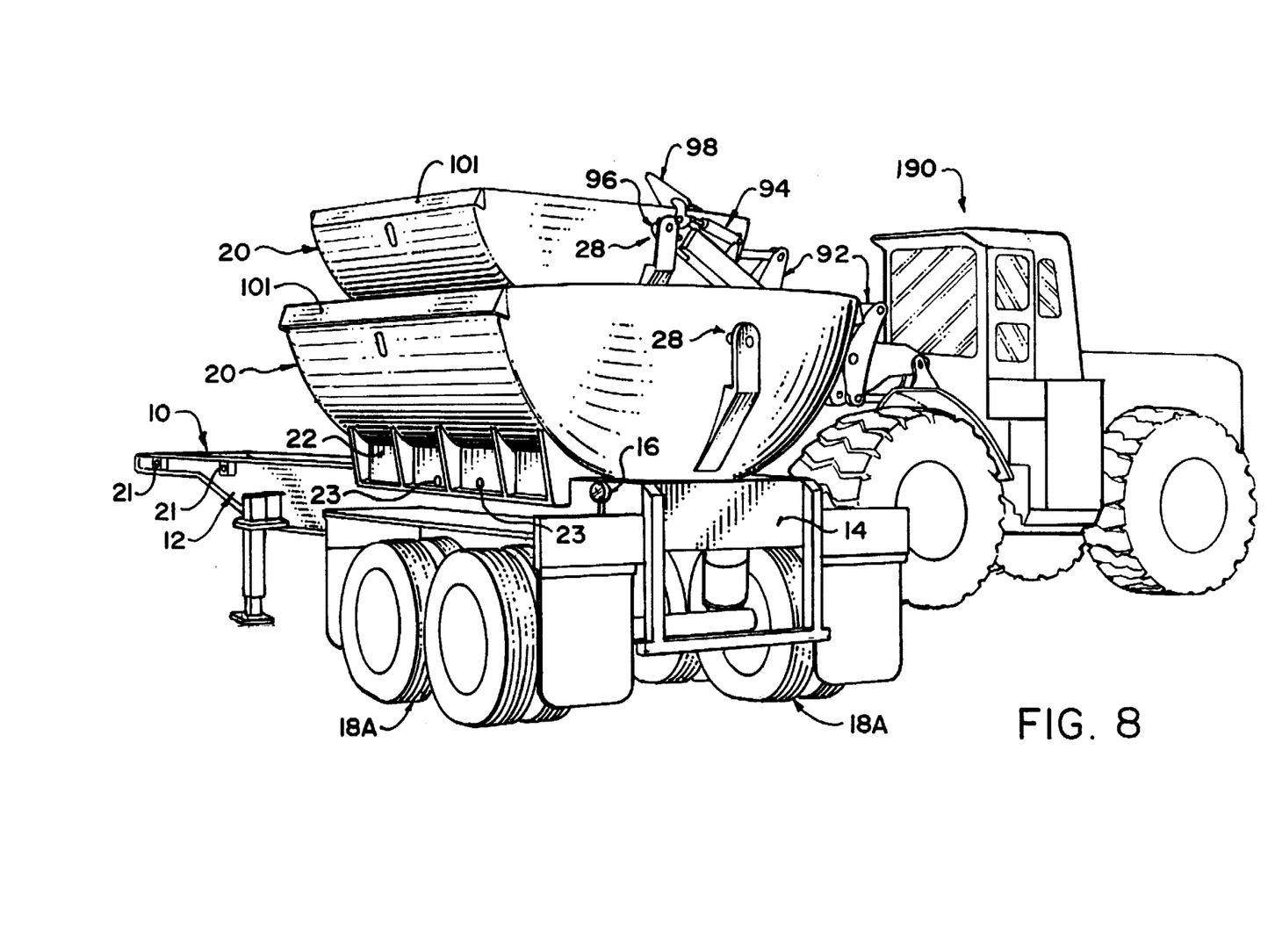
FIG. 8 is a perspective view of the basic trailer chassis of the invention with two rock hauling modules attached, one of which is being unloaded by a front end loader.
Figure 9:
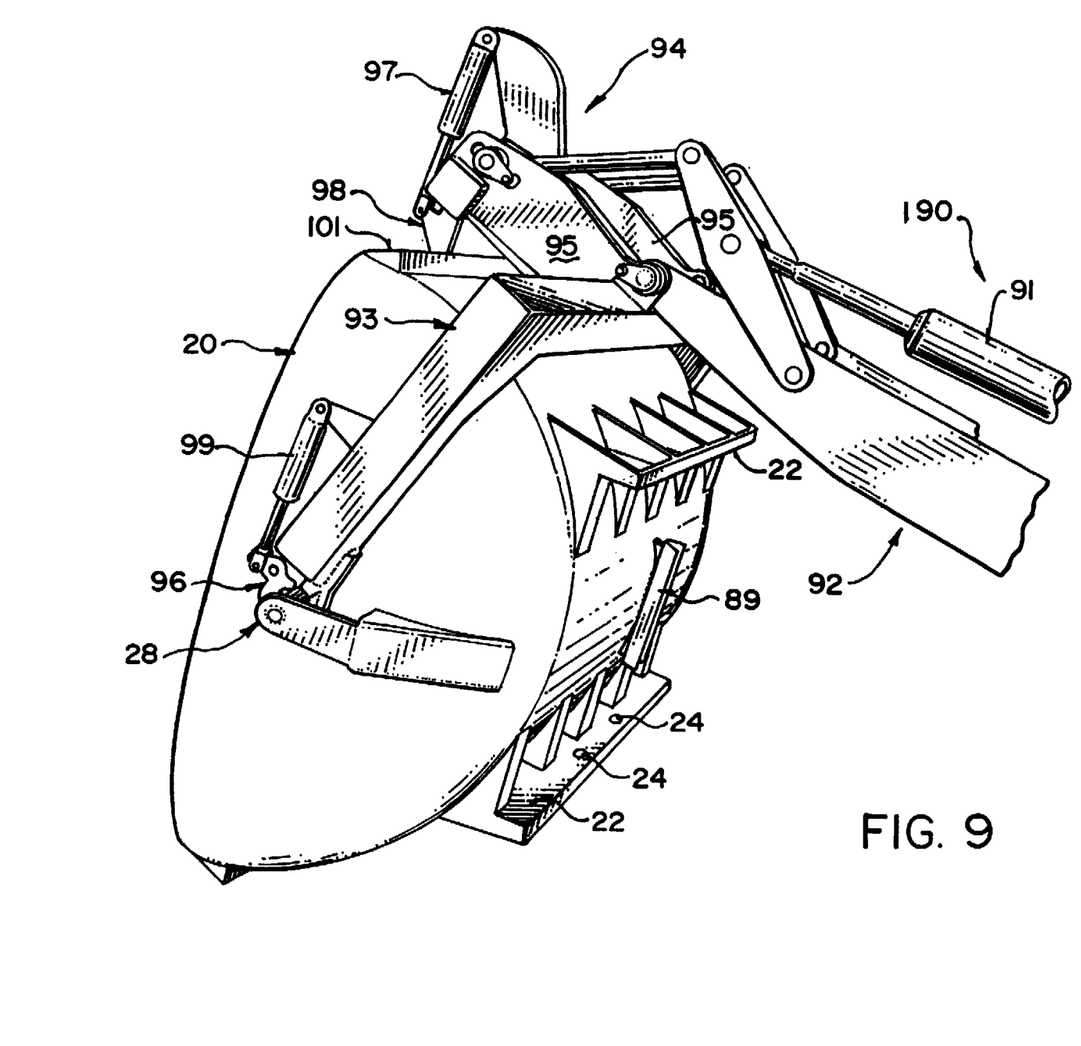
FIG. 9 is a detail perspective view of the rock hauling module shown in FIG. 8 being unloaded by a front end loader.

To load the modules onto and off of the trailer or railcar frame 10, a front end loader 190, fork lift or crane can be utilized as shown in FIG. 8 and 9. In respect of a crane arrangement, a third chain would be used to tilt the rock bin, for example, for dumping. If a front end loader 190 is used, specially designed forks 93 and dumping mechanism 94 are provided which use the existing lift arm 92 on the front end loader, and use a third hydraulic cylinder 99 to lock the arms to the lug and pin assembly 28. The existing bucket cylinder 91 is used to dump the bin by arms 95 attached to forks 93. Hydraulic cylinder 97 is used to pivot tooth 98 which clamps against rim 101 of bin 20 to prevent it from tilting. Forks 93 are secured to lug pin assembly 28 by a thumb-and-finger clamping arrangement 96, as shown in FIG. 8 and 9, whereby a fixed thumb portion engages the pin of assembly 28 and the finger portion is pivoted to enclose pin 28 by hydraulic cylinder 99. In this way the bin can pivot relative to forks 93 while being lifted.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A load transportation system comprising a wheeled vehicle adapted for carrying one of a plurality of transport modules, said vehicle comprising:

a) a frame having a plurality of holes extending from the interior surface through to the exterior surface thereof;
   b) two or more wheeled axles secured in said frame;
   c) means for aligning a transport module on said frame;
   d) a plurality of movable locking pins mounted on the interior of said frame;
   e) power means for extending and retracting said locking pins through said holes in said frame from a first extended position to a second retracted position;
   f) air suspension means supported by said axles for receiving said module, comprising a plurality of pneumatic cushions on said frame, wherein said frame is provided with a load-bearing plate bearing on said cushions for receiving said load-carrying transport module; and
   g) air pressure measuring and displaying means for measuring the air pressure in said air suspension means.

2. The load transportation system of claim 1 further comprising a load-carrying transport module, wherein said load-carrying transport module is provided with a downwardly extending flange provided with a plurality of holes for receiving said locking pins.

3. The load transportation system of claim 1 comprising a plurality of load-carrying transport modules, wherein said load-carrying transport modules are each provided with a downwardly extending flange provided with a plurality of holes for receiving said locking pins.

4. The load transportation system of claim 2 wherein said wheeled vehicle is a railcar.

5. The load transportation system of claim 2 wherein said wheeled vehicle is a truck trailer.

6. The load transportation system of claim 2 wherein said load-carrying transport module comprises a tank.

7. The load transportation system of claim 2 wherein said load-carrying transport module comprises a standard container.

8. The load transportation system of claim 2 wherein said load-carrying transport module comprises a flat bed.

9. The load transportation system of claim 2 wherein said load-carrying transport module comprises an open bin.

10. The load transportation system of claim 2 wherein said power means comprises an air brake drum and said locking pins are mounted on a piston movable on said drum.

11. The load transportation system of claim 1 wherein said means for aligning a transport module on said frame is provided on the upper surface of said load-bearing plate and said load-carrying transport module comprises a saddle for mating with said aligning means.

12. The load transportation system of claim 9 wherein said open bin comprises a pin and lug assembly for lifting and dumping.

13. The load transportation system of claim 12 further comprising a front end loader for lifting and dumping said bin.

14. The load transportation system of claim 13 wherein said front end loader comprises a fork arm for attaching to said pin and lug assembly and power actuated clamping means for releasably and pivotally grasping said pin and lug assembly.

* * * * *